United States Patent
Yeo et al.

(10) Patent No.: US 11,874,489 B2
(45) Date of Patent: Jan. 16, 2024

(54) LIGHT FIXTURE WITH EDGELIT OPTICAL ELEMENT FOR DIRECT DOWNLIGHTING APPLICATIONS

(71) Applicant: Fusion Optix, Inc., Woburn, MA (US)

(72) Inventors: Terence Yeo, Boston, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 0 days.

(21) Appl. No.: 17/693,273

(22) Filed: Mar. 11, 2022

(65) Prior Publication Data

US 2023/0055730 A1    Feb. 23, 2023

Related U.S. Application Data

(63) Continuation of application No. 17/476,212, filed on Sep. 15, 2021, now Pat. No. 11,543,582, which is a continuation of application No. 17/107,941, filed on Nov. 30, 2020, now Pat. No. 11,163,104, which is a continuation-in-part of application No. 16/039,320, filed on Jul. 18, 2018, now Pat. No. 10,852,466.

(Continued)

(51) Int. Cl.

| F21V 8/00 | (2006.01) |
| F21V 7/00 | (2006.01) |
| F21Y 115/10 | (2016.01) |
| F21S 8/02 | (2006.01) |
| F21Y 105/00 | (2016.01) |

(52) U.S. Cl.
CPC ............ *G02B 6/0055* (2013.01); *F21S 8/024* (2013.01); *F21S 8/026* (2013.01); *F21V 7/0016* (2013.01); *F21Y 2105/00* (2013.01); *F21Y 2115/10* (2016.08)

(58) Field of Classification Search
CPC ... G02B 6/0091; G02B 6/0028; G02B 6/0046
See application file for complete search history.

(56) References Cited

U.S. PATENT DOCUMENTS

2018/0188602 A1\*  7/2018  Liu ..................... G03H 1/22

\* cited by examiner

*Primary Examiner* — Karabi Guharay

(57) ABSTRACT

Various light fixtures are provided for mounting within and below suspended grid ceilings incorporating T-bars and ceiling panels. The light fixtures comprise a double or single edgelit planar or wedge shaped optical element that functions simultaneously as an outcoupling TIR light guide and a light scatterer or direct throughput lens. It provides a number of benefits because of its edgelit design including; thin forms and shallow depth, extended emitting area and controlled lighting distributions from one or two light guide faces. Additionally, areas typically dedicated to bezels or edge reflectors can be greatly reduced or eliminated due to decreased hotspotting to provide a fixture face with very high percentage of light emitting area. Embodiments are described for direct, indirect, and direct indirect configurations. The embodiments provide increased light output, uniformity of brightness and color and controlled direct and indirect lighting distributions and with single or dual off axis intensity peaks. Such light distributions are particularly useful in applications such as direct illumination of offices, schools, hospitals, retail or commercial spaces and table tops or work surfaces or indirect illumination of ceilings, wall washing and surface area lighting as well as other lighting applications.

45 Claims, 23 Drawing Sheets

Related U.S. Application Data

(60) Provisional application No. 62/534,187, filed on Jul. 18, 2017.

| Configuration | lm/W | % Indirect (Up) | Beam Angle | Angle of Peak Intensity | Peak Candela | Head-On / Peak Ratio |
|---|---|---|---|---|---|---|
| White Flat Reflector no LG | 176 | 100% | 156 | ±73° Up | 433 | 73% Up |
| White Flat Reflector with LG (Fig. 18) | 157 | 100% | 144 | ±48° Up | 421 | 80% Up |
| White Reflective Apertures with LG (Fig. 17) | 151 | 86% | 143 Up / 146 Down | ±48° Up / ±48° Down | 362 | 75% Up / 71% Down |

LIGHT FIXTURE WITH EDGELIT OPTICAL ELEMENT FOR DIRECT DOWNLIGHTING APPLICATIONS

RELATED APPLICATIONS

This application is a continuation of US non-provisional utility application Ser. No. 17/476,212 filed Sep. 15, 2021 titled "Optical Element and Lighting Module with Multimode Output" which is itself a continuation of US non-provisional utility application Ser. No. 17/107,941 filed Nov. 30, 2020 titled "Light Fixture with Multimode Optical Output" which is itself a continuation in part of US non-provisional utility application Ser. No. 16/039,320 filed Jul. 18, 2018 which itself claims the benefit of U.S. provisional patent application Ser. No. 62/534,187 titled "Lighting Sub-assembly With Dual Mode Optical Element" filed Jul. 18, 2017.

SUMMARY

Light fixture embodiments provide benefits of increased light output, uniformity of brightness and color by use of optical elements that functions simultaneously as an outcoupling TIR light guide and a direct throughput lens. Provided are typical benefits of an edgelit light guide design including shallow depth, extended emitting area, and off axis light distributions such as batwing distributions particularly useful in downlighting and other lighting applications. Additionally, area dedicated to bezels or edge reflectors can be greatly reduced or eliminated due to decreased hotspotting to provide a fixture face with very high percentage of light emitting area. Some embodiments can be configured as direct/indirect light fixtures.

BACKGROUND

Lighting systems incorporating optical waveguides positioned close to the light source provide significant benefits such as thin form factor and adjustable lighting output. However, efficient optical coupling from the light source to the waveguide is difficult to achieve and typically 10% to 30% of light is lost. Traditional approaches that target full edge coupling of light into optical waveguides typically lose efficiency by having low utilization of uncoupled light and of light that enters the input edge but escapes light guide on a non-output face or near the edge where the output is blocked by a bezel or reflector. Often bezels are deemed necessary to hide "hotspotting", non-uniform brightness close to light sources due to excessive outcoupling near the edge. In addition, light sources such as LEDs often have a variation of their color output over angle that are typically accentuated by coupling into optical light guides.

DESCRIPTION

Figure 1A:
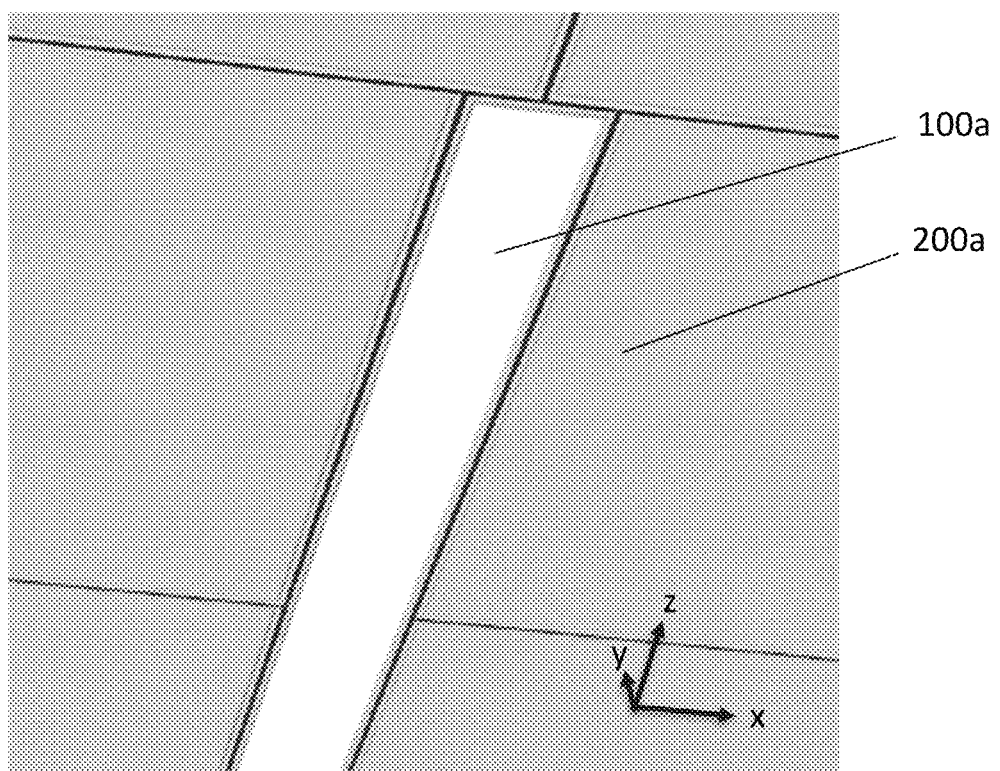
FIG. 1a is perspective view of a ceiling mounted light fixture embodiment.

The accompanying drawings are not intended to be drawn to scale. In the drawings, each identical or nearly identical component that is illustrated in various figures is represented by a like numeral. For purposes of clarity, not every component may be labeled in every drawing.

Figure 1B:
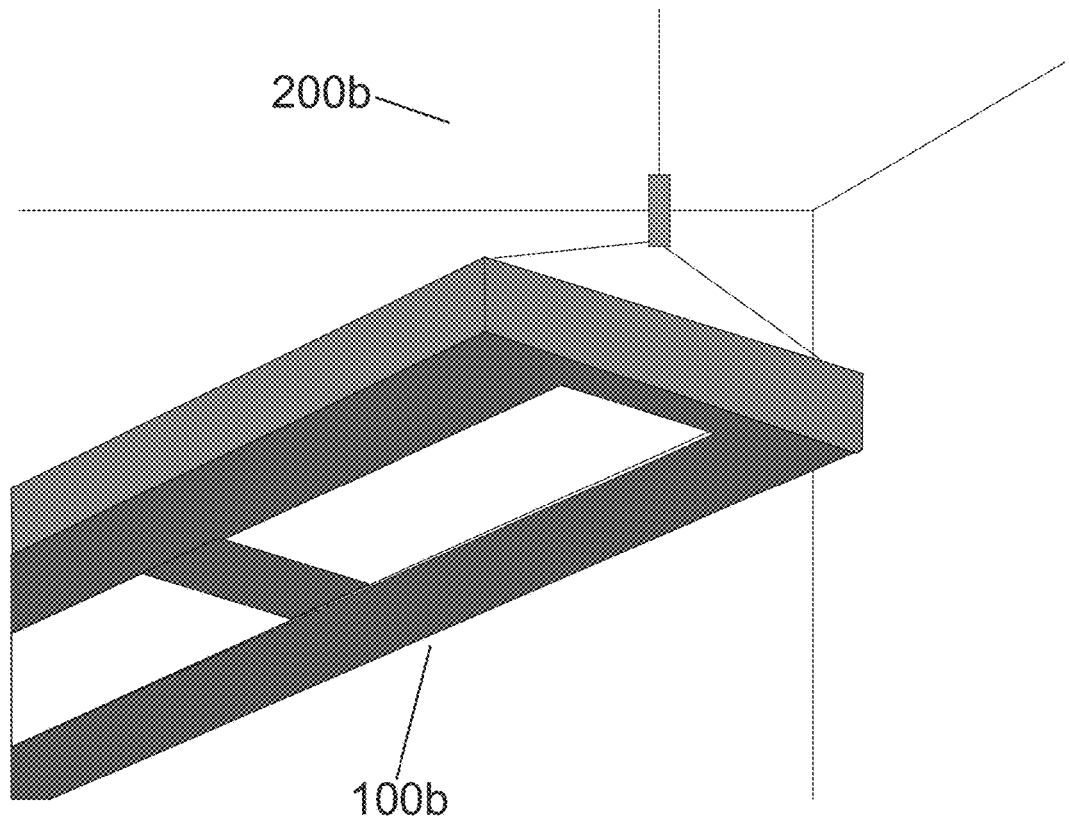
FIG. 1b is a perspective view of a suspended light fixture embodiment.

Embodiment configurations can be implemented in a wide range of light fixtures. One such fixture that benefits from advantages in aesthetic appearance, light distribution pattern, and luminous efficacy is shown in FIG. 1a The light fixture 100a is mounted flush with ceiling tiles 200a in a ceiling in a direct lit downlighting application. Alternatively, FIG. 1b shows an embodiment suspended direct/indirect light fixture 100b which is mounted to hang below the ceiling 200b and emit light out of both top and bottom output faces of the light fixture; in standard lighting industry terminology the downward light being considered "direct" and the upward light illuminating the ceiling considered "indirect". Typical light fixture embodiments include LEDs as light sources and although the written descriptions may reference LED in the singular, typically an array of LEDS is used and should be implied if not explicitly stated or illustrated. Many types of reflectors may be used in various embodiments such as diffuse or specular reflectors or reflectors with surface features for redirection of incident light. Optical elements may contain surface features for purposes of light outcoupling, light redirection, or visual appearance. Arrays of features can be used such as a linear lenticular array which is often a suitable pattern.

Figure 2:
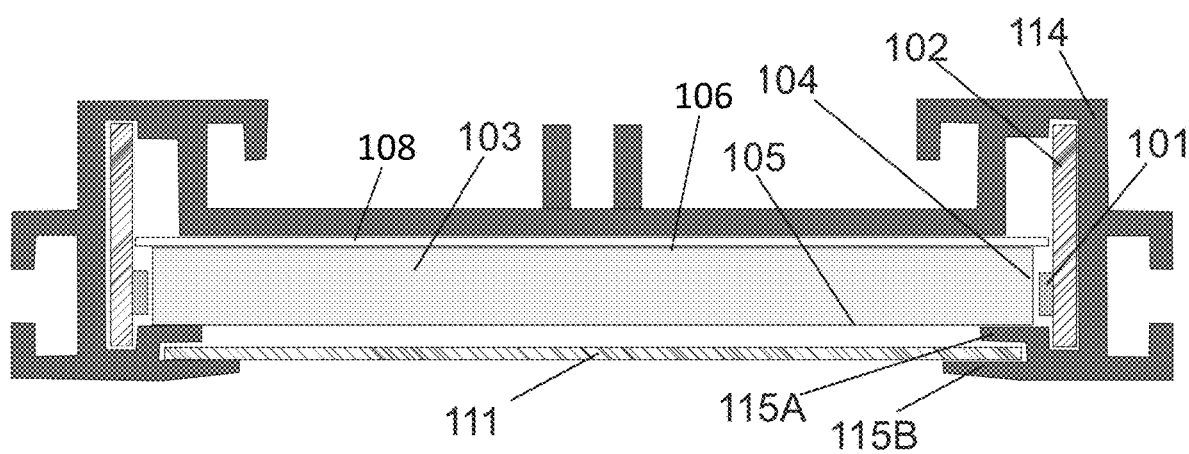
FIG. 2 is a cross section view of a light fixture with a conventional planar light guide.

For comparison with the embodiment A of FIG. 3, FIG. 2 shows a cross-section view of a lighting fixture embodiment having an edge lit light guide of conventional rectangular form factor as an optical element. The housing 114 holds in place the LED board 102 with LED 101, light guide 103, reflector 108, and cover lens 111. The light guide 103 is a rectangular shaped sheet with an input face 104 and an output face 105 that are adjacent faces oriented at a 90 degree angle. Bezels 115A and 115B cover a significant portion of the ends of the light guide in order to hold the light guide and cover lens in place and also to mask hot spot non-uniformities near the input face of the light guide 103. The reflector 108 is positioned adjacent to the inner opposing face 106 to reflect light output from the inner opposing face back into the optical element.

Figure 3A:
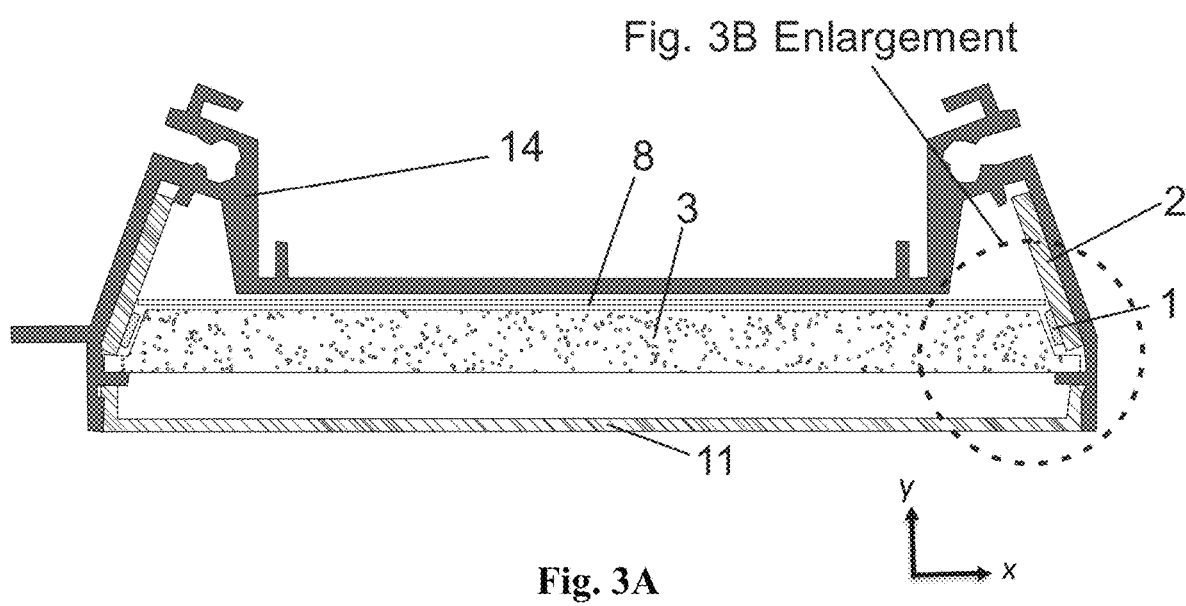
FIGS. 3A and 3B (enlargement view) are cross section views of a light fixture configured with an optical element having angled input edges and an overhang feature at the input edges.
Figure 3B:
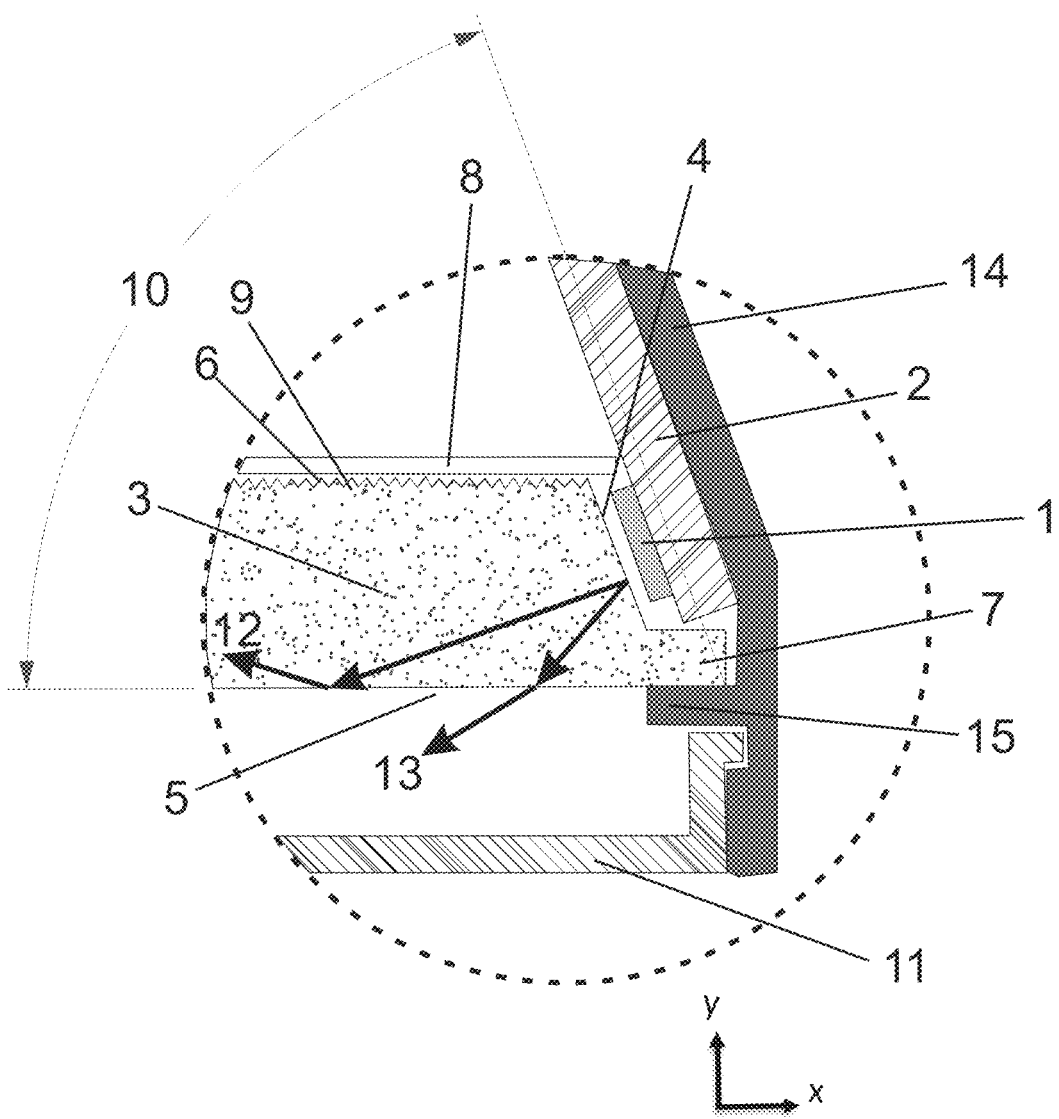

FIG. 3A and FIG. 3B show a cross-section view of embodiment A lighting assembly in which LED 1 light sources are mounted on an LED board 2 which providing a linear light source that inputs light into the optical element input face 4. Light propagates within the optical element 3 and is emitted from the output face 5. A portion of the light propagates directly through the optical element 3 on the direct transmission path 13 while concurrently a portion of the light propagates within the optical element on a TIR path 12 until it outcouples from the optical element 3. Means for outcoupling light are provided by lenticular surface 9 on the optical element opposing face 6 as well as by the light scattering composition of the bulk optical element 3. In embodiment A the light scattering composition is provided by polymer beads dispersed within an acrylic matrix material having a differing refractive index. Light outcoupling out the opposing face 6 is redirected toward the optical element output face 5 by the reflector 8.

The optical element 3 is comprised of a light transmissive material having a refractive index greater than the surrounding ambient environment; in the case of air>1. Optionally, regions of differing refractive index may be dispersed within the volume to scatter light and cause a portion of light to out couple from the optical element. Embodiment A is comprised of PMMA acrylic matrix with PMMA beads of differing refractive index dispersed throughout the volume. Other alternative materials for an optical element include but are not limited to clear or translucent grades of polycarbonate, cyclic olefin copolymers, silicone, and glass. PMMA acrylic has a refractive index of approximately 1.5 which in air produces a total internal reflection (TIR) critical angle of approximately 42 degrees. Dispersed light scattering regions within the optical element can be achieved by dispersing materials of differing refractive index throughout the material. Alternatively, $2^{nd}$ phase regions can be formed in-situ during processing of immiscible material blends.

The housing 14 encloses and holds in place optical components including the optical element 3, LED board 2, and if optionally present, the cover lens 11. The housing contains a bezel 15 feature which functions to cover the edge of the optical element including some or all of the optical element overhang 7.

The optical element input face 4 is inset from the outer perimeter of the optical element output face 5 and is angled so as to form an acute input/output face alignment angle 10, the angle being 70 degrees in the specific case of embodiment A. The acute input/output alignment angle functions to reduce "headlamp" type hot spots from the reflector 8 near the input face 4 and also increases the ratio of direct transmission to TIR light propagating within the optical element. The optical element overhang 7 provides a feature for mechanically securing the optical element in the housing 14 without excessively trapping light behind the bezel 15 as typically occurs in a conventional edge lit construction such as with the bezels 115A and 115B and input face 104 of FIG. 2. This functions to improve overall efficacy (lumens per watt) of the lighting system.

The cover lens 11 is an optional component which can be configured to enclose the output face of the light fixture and provide an appearance more uniform in brightness and color. Adjustments to the cover lens 11 surface geometry and bulk light scattering properties can be used to modify the output light distribution from that originating from the optical element output face 5. For example, adjustments to cover lens surface or volumetric light redirecting properties can be used to decrease the wide angle degree of lobes in the light distribution pattern or make brightness or color variations in the beam pattern emitting from the optical element output face more uniform. In the specific case of embodiment A, the surface is congruent with the shape of the cover lens and the bulk of the cover lens material has light scattering properties measured to have a symmetrical full width half maximum value of 68 when measured as a separate component on measurement equipment using as an input light source a narrow beam laser normal to the input surface.

Figure 4:
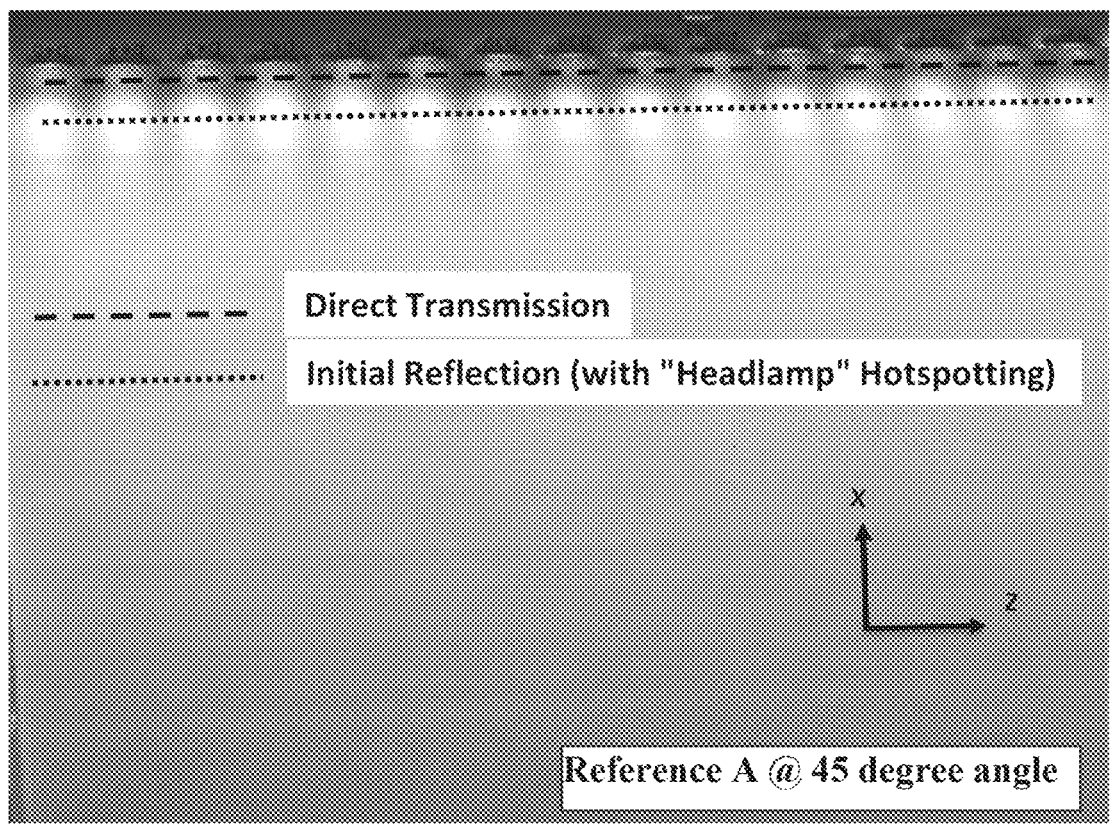
FIG. 4 is a digital image of a Reference A light fixture representing a conventional edgelit light guide construction as shown in FIG. 2 but without a bezel or cover lens.
Figure 5:
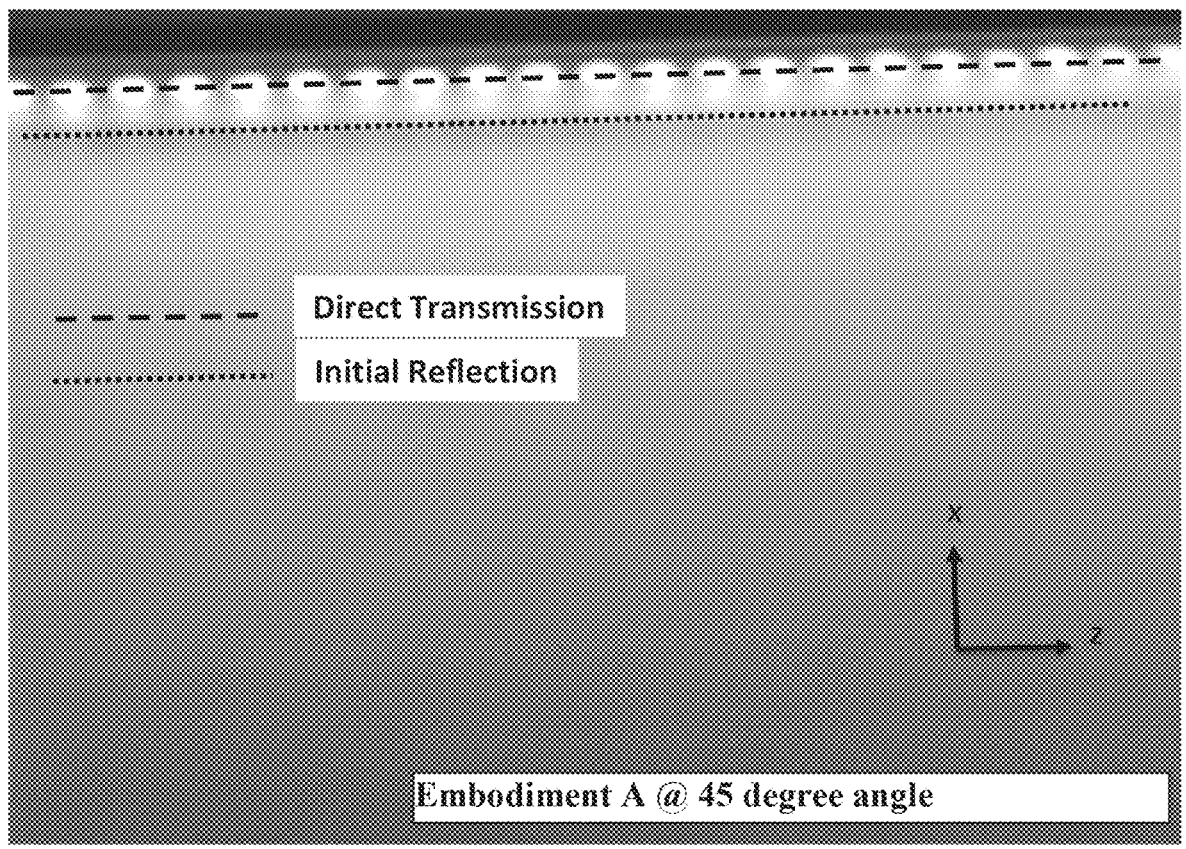
FIG. 5 is a digital image of Embodiment A light fixture shown in FIG. 3A and FIG. 3B but without a bezel or cover lens.

FIG. 4 is a digital image of a Reference A light fixture representing a conventional edgelit light guide construction as shown in FIG. 2 but without a bezel or cover lens. FIG. 5 is a digital image of Embodiment A light fixture shown in FIG. 3A and FIG. 3B but without a bezel or cover lens. Both images were taken at a 45 degree viewing angle of the output face. Marked on the images are locations where line scans were analyzed to assess brightness levels corresponding to light directly transmitted through the light guide/optical element and light that does an initial reflection from the reflector near the input face. In the case Reference A, the initial reflection produces significant hot spot patterning commonly referred to as "headlamping" due to similarity in appearance of automotive headlamps projecting onto ground in front of a car. The headlamping effect is negligible in the FIG. 5 image of embodiment A.

Figure 6:
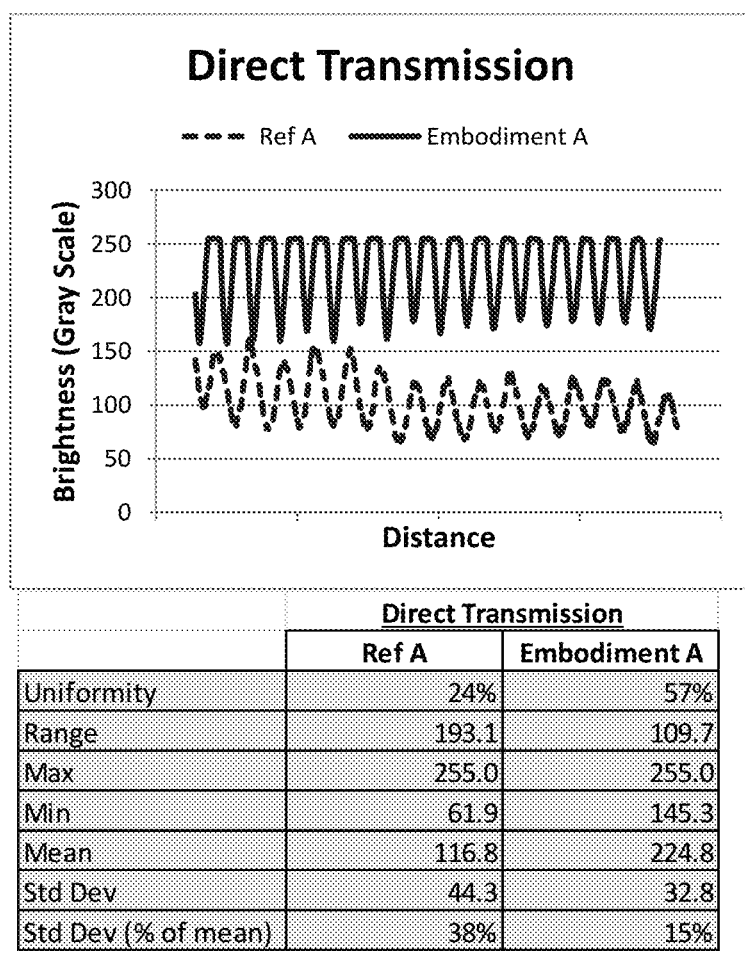
FIG. 6 is a graph and table comparing quantitative metrics of Ref A vs. Embodiment A for characterizing brightness values along the line scan paths for direct transmission shown in FIG. 4 and FIG. 5.
Figure 7:
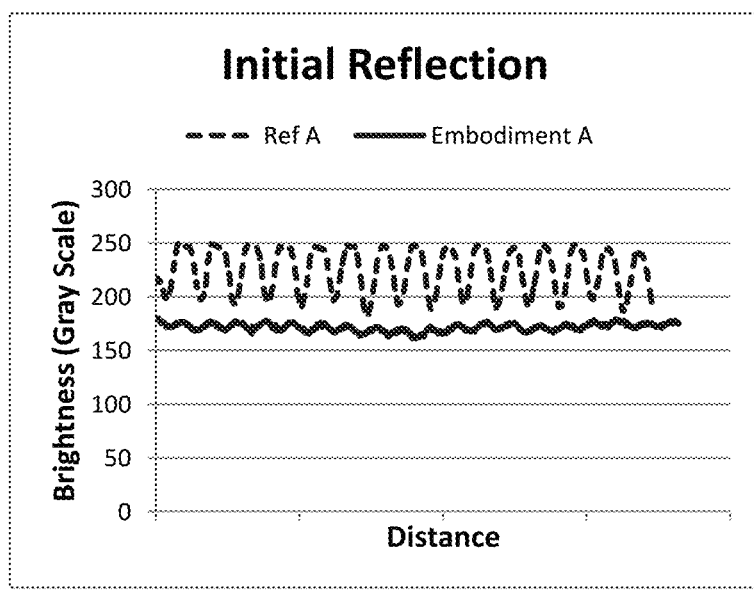
FIG. 7 is a graph and table comparing quantitative metrics of Ref A vs. Embodiment A for characterizing brightness values along the line paths for initial reflection shown in FIG. 4 and FIG. 5.

FIG. 6 and FIG. 7 each show graphs and quantitative metrics characterizing brightness values along the line scan paths; FIG. 6 for direct transmission and FIG. 7 for initial reflection. For embodiment A, the direct transmission is significantly greater than reference A. In addition to the data of FIG. 6, this is evidenced by illumination measurements at 45 degrees comparing full optical light guide/optical element output vs. that with the output face masked except for the narrow band of direct transmission zone near the input edge. In this case, embodiment A direct transmission was 28% of full output at 45 degree angle while reference A direct transmission was 12% of total output at 45 degree angle.

Figure 8:
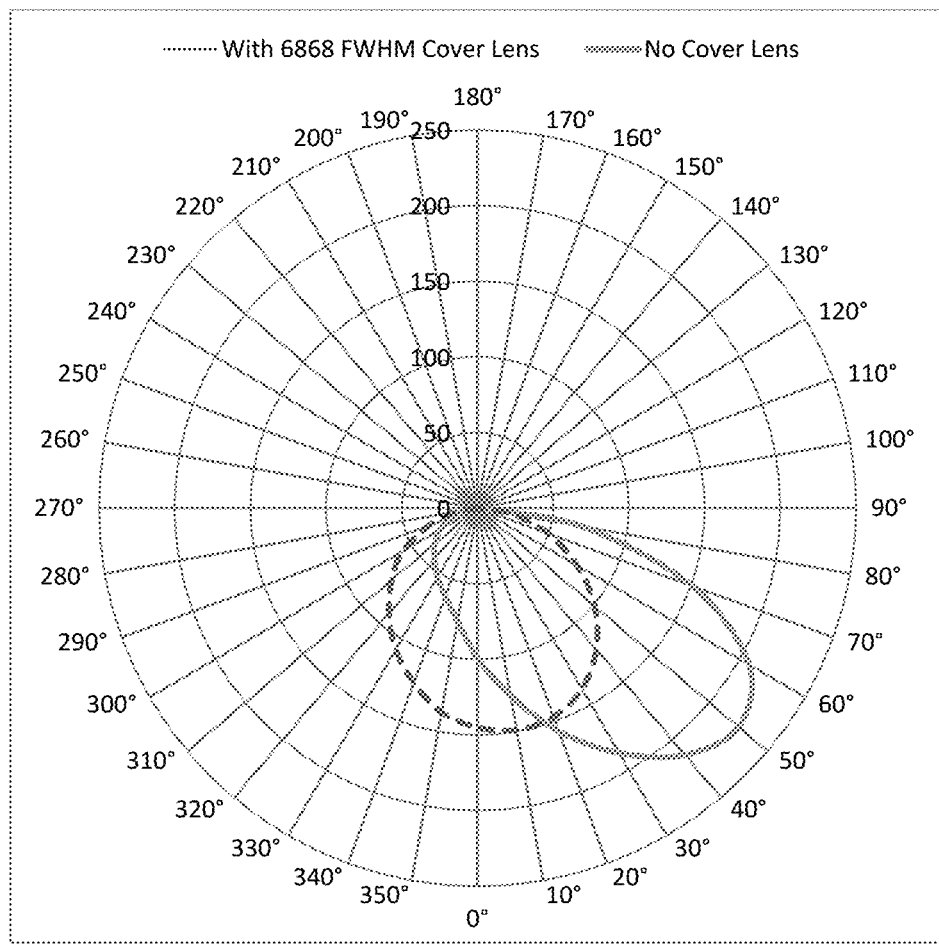
FIG. 8 is a polar plot of embodiment A with one side only LED strip on and the light fixture oriented down as a direct lit downlighting fixture.

FIG. 8 is a polar plot of embodiment A with one side only LED strip on and the light fixture oriented downward as a direct lit downlighting fixture. The cover lens is embodiment A is a diffusion lens characterized by a goniometric radiometer as having a symmetric FWHM of 68. This provides a large amount of light scattering that decreases the off axis orientation of light emitted from the optical element output face and produces a light distribution closer to lambertian. The amount of asymmetry in light distribution output can be controlled by selection of amount of light scattering in the cover lens to obtain a range of options between the "no cover lens" and "with cover lens" options illustrated in FIG. 9.

Figure 9:
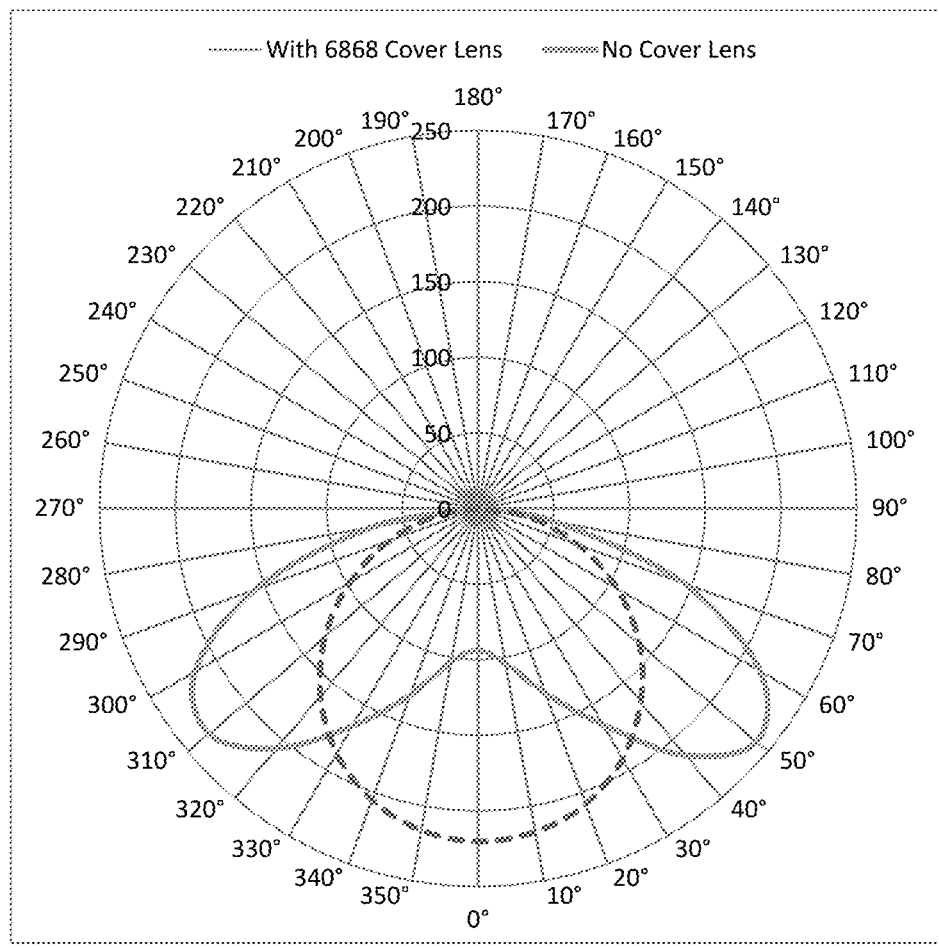
FIG. 9 is a polar plot of embodiment A with LED strips on both sides on and the light fixture oriented down as a direct lit downlighting fixture.

FIG. 9 is polar plot of embodiment A with LED strips on both sides of an optical element and the light fixture is oriented down as a direct lit downlighting fixture and shows a batwing type light distribution which can be adjusted to provide less asymmetry by increasing light scattering in the cover lens. The cover lens in embodiment A has a symmetric FHWM of 6868 which results in a very symmetric light distribution.

Figure 10:
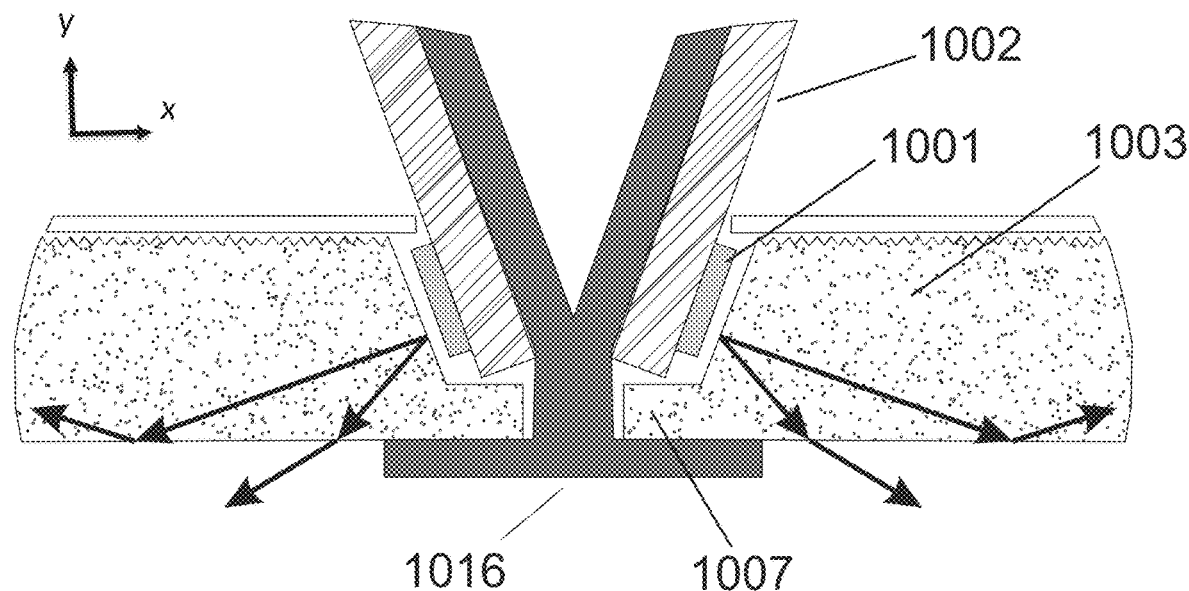
FIG. 10 is a cross section detail view of an embodiment with two optical elements configured to receive light from a central light source structure.

FIG. 10 is a cross section detail view of an embodiment with two optical elements configured to receive light from a central light source structure. Two LED boards 1002, are positioned upon a central light source mount 1016 to emit light from LEDs 1001 in opposing orientations into optical elements 1003, the result being a batwing type light output from the light fixture. The central light source mount also serves as a mounting ledge for the optical element overhang 1007 and also a bezel to mask from view the edge of the optical element, thereby appearing the uniformity appearance.

Figure 11:
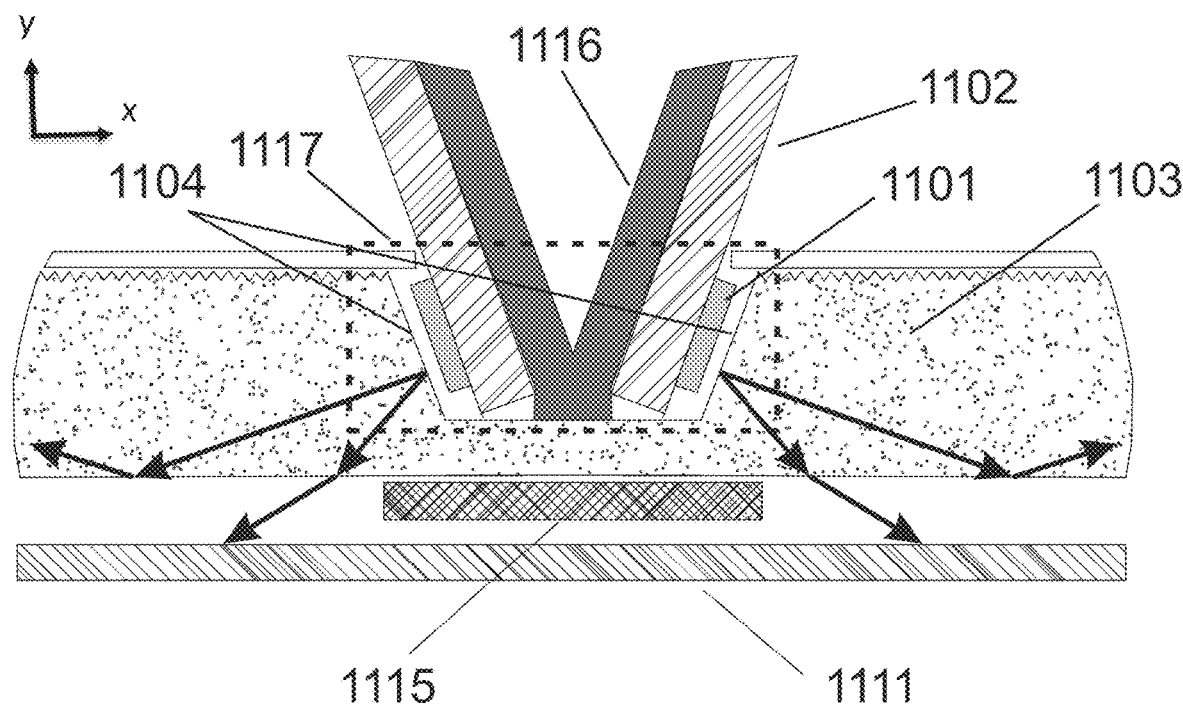
FIG. 11 is a cross section detail view of an embodiment with two optical element input faces within a recessed cavity.

FIG. 11 is a cross section detail view of an embodiment with two optical element input faces 1104 positioned within a recessed cavity 1117. Two optical elements 1103 are configured to receive light from a central light source structure. Two LED boards 1102, are positioned upon a central light source mount 1116 to emit light from LEDs 1101 in opposing orientations, the result being a batwing type light output from the light fixture. The central light source mount also serves as a mounting ledge for the optical element overhang 1007 and also optionally a bezel 1115 to mask from view the edge of the optical element, thereby appearing the uniformity appearance. A cover lens 1111 may also be optionally positioned to further enclose the fixture and/or adjust light distribution or appearance.

Figure 12:
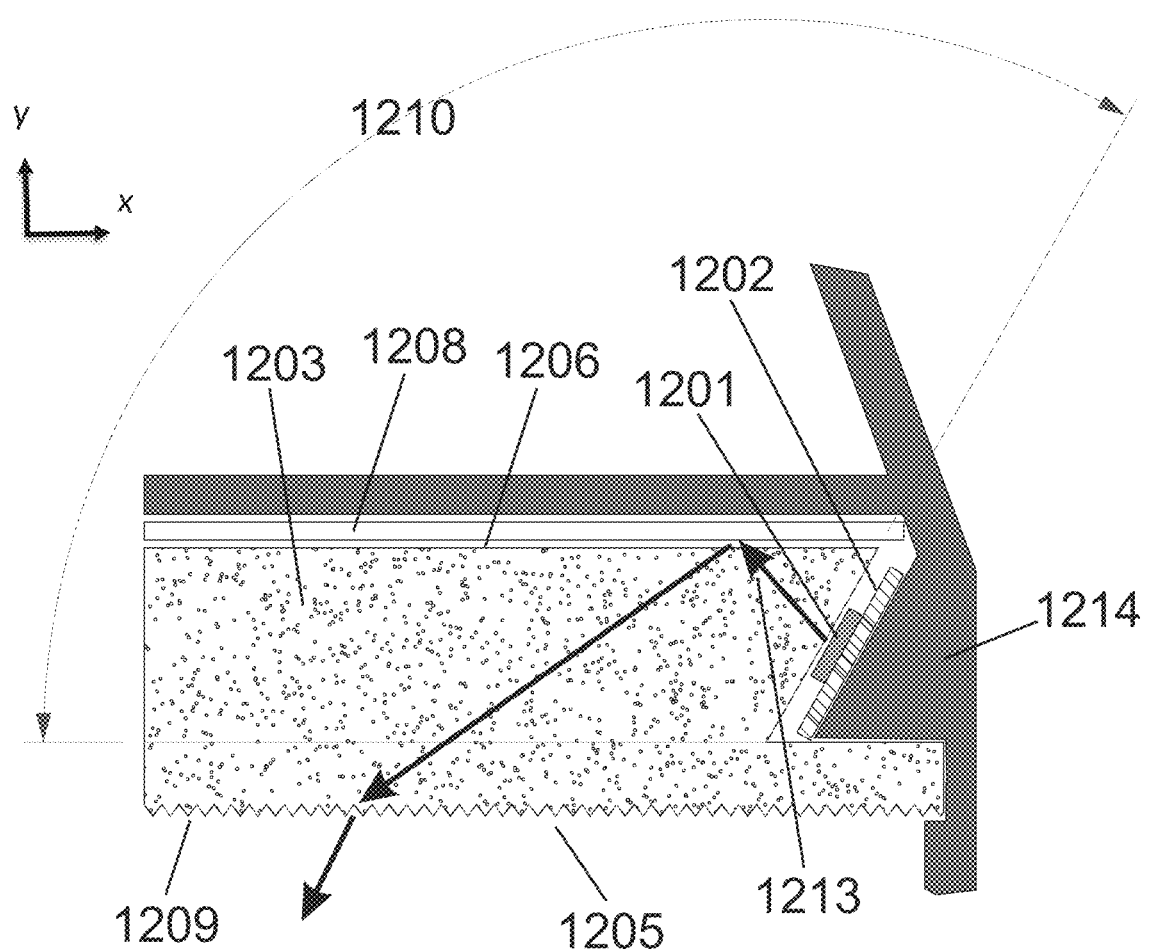
FIG. 12 is a cross section view of a light fixture embodiment having an input face/output face alignment angle configured to direct a significant portion of light out the opposing face to be subsequently reflected out the output face.

FIG. 12 is a cross section view of a light fixture embodiment having an optical element input/output face alignment angle 1210 configured to direct a significant portion of direct transmission light 1213 out the optical element opposing face 1206 to be subsequently reflected off the reflector 1208 and back through the optical element 1203 and out the output face 1205. The light redirecting features 1209 on the output face 1205 function to redirect the optical path.

Figure 13:
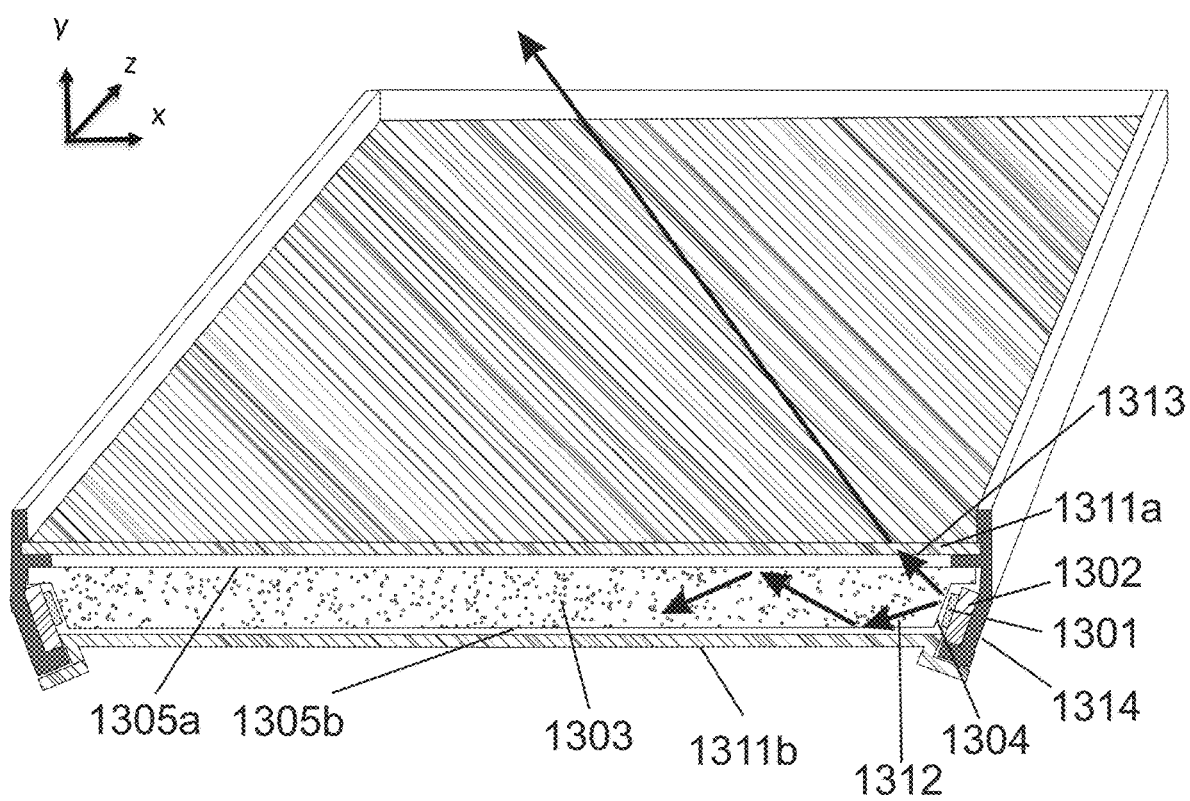
FIG. 13 is cross-section perspective view of a direct/indirect light fixture embodiment with an x-y profile geometry linearly extruded in the z-axis to create a generally rectangular fixture shape

FIG. 13 is cross-section perspective view of a direct/indirect light fixture embodiment with an x-y profile geometry linearly extruded in the z-axis to create a generally rectangular fixture shape. Light from the LED 1301 on the LED board 1302 is received by the optical element input face 1304 of the optical element 1303 and propagates along a direct transmission path 1313, as illustrated by a single example light ray, and exits the optical element through optical element output face 1305a then proceeds to transmit through the cover lens 1311a resulting in upward light distribution which becomes part of the indirect light output of the fixture. The optical element 1303 contains light scattering regions which cause some portion of light to scatter enough to exceed the critical total internal reflection angle to outcouple out one of the two optical element output faces 1305a and 1305b and then subsequently through a cover lens 1311a or 1311b. In this embodiment light propagating out the bottom lens cover 1311b is considered direct light fixture output while light propagating out the lens cover 1311a is considered indirect light fixture output.

Figure 14:
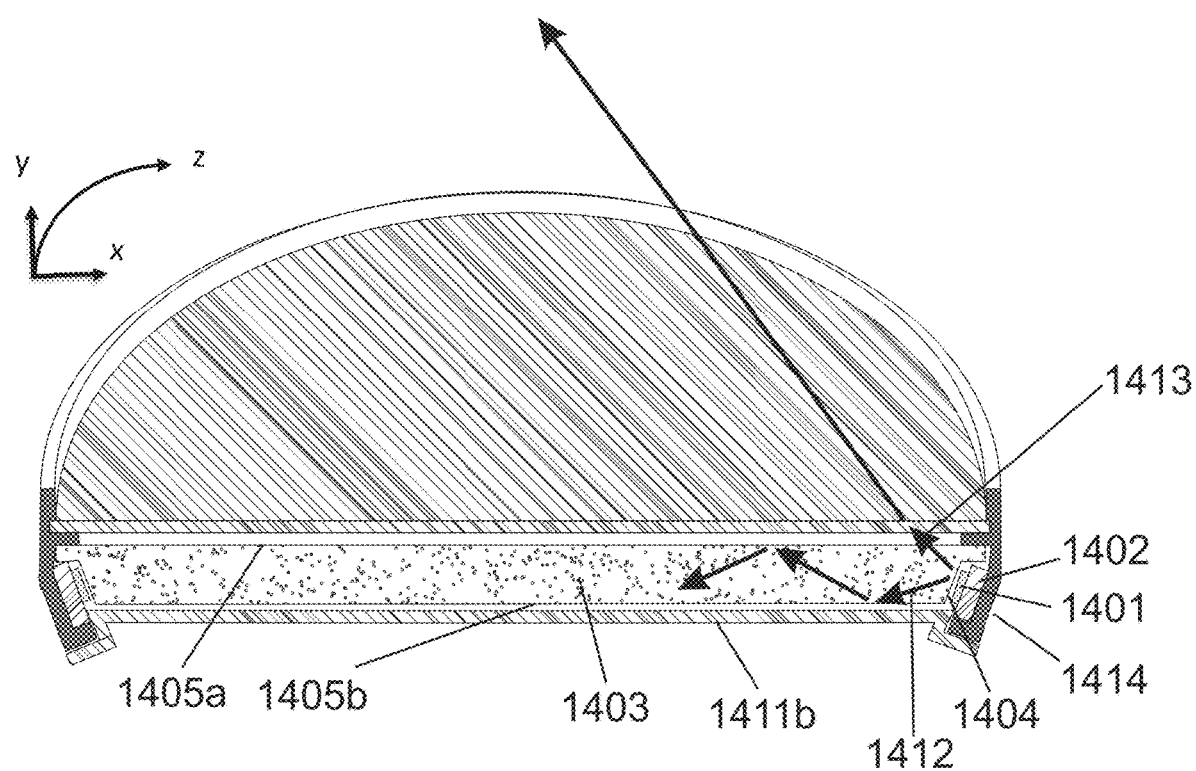
FIG. 14 is a cross-section perspective view of a direct/indirect light fixture embodiment with the x-y profile geometry is rotated to produce a generally circular shape fixture.

FIG. 14 is a cross-section perspective view of a direct/indirect light fixture embodiment with the x-y profile geometry is rotated to produce a generally circular shape fixture. Light from the LED 1401 on the LED board 1402 is received by the optical element input face 1404 of the optical element 1403 and propagates along a direct transmission path 1413, as illustrated by a single example light ray, and exits the optical element through optical element output face 1405a then proceeds to transmit through the cover lens 1411a resulting in upward light distribution which becomes part of the indirect light output of the fixture. The optical element 1403 contains light scattering regions which cause some portion of light to scatter enough to exceed the critical total internal reflection angle to outcouple out one of the two optical element output faces 1405a and 1305b and then subsequently through a cover lens 1411a or 1411b. In this embodiment light propagating out the bottom lens cover 1411b is considered direct light fixture output while light propagating out the lens cover 1411a is considered indirect light fixture output. The circular geometry enables some novel light distributions. In particular, elliptical (including circular) light distributions can be achieved. Typically the input face/output face alignment angle will be rotated 360 degrees which will be contribute to a circular light distribution. Variations in cover lens light redirecting features can contribute to more elliptical light distributions; for example, if there are an array of linear lenticular features the features will direct light differently at differing input angles.

Figure 15:
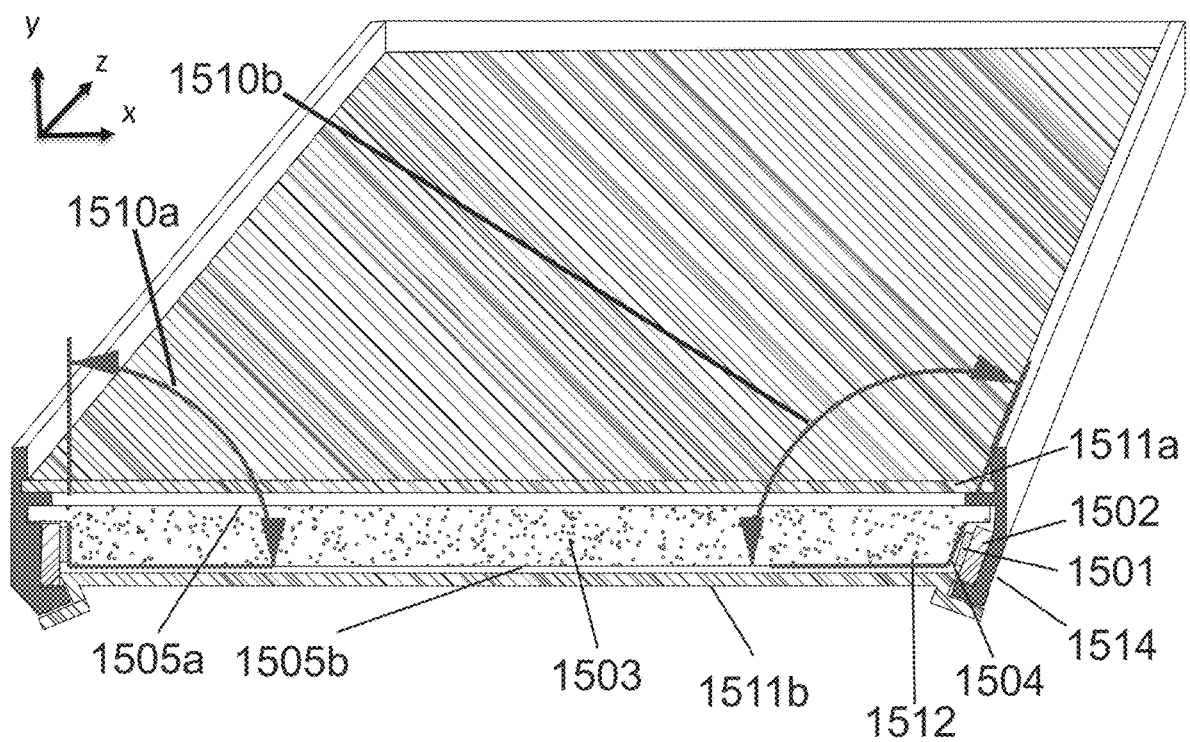
FIG. 15 is a cross-section view of a light fixture embodiment having 2 input faces with differing input face/output face alignment angles.

FIG. 15 is a cross-section perspective view of a direct/indirect light fixture embodiment having 2 input faces with differing optical element input face/output face alignment angles. Optical element input face 1504a and optical element output face 1505b create a 90 degree optical element input face/output face alignment angle 1510a. In contrast, optical element input face 1504b and optical element output face 1505b create an optical element input face/output face alignment angle 1510b of 110 degree which produces an optical element that projects more light out optical element output face 1505a and cover lens 15111a in an upward indirect direction of the light fixture than through the downward direct light fixture direction wherein light escapes the optical element 1503 through the optical element output face 1505b and subsequently through the cover lens 1511b. Each input face of the optical element is aligned with an LED board 1501 with LED 1502 and with each LED board mounted onto a housing 1514.

Figure 16:
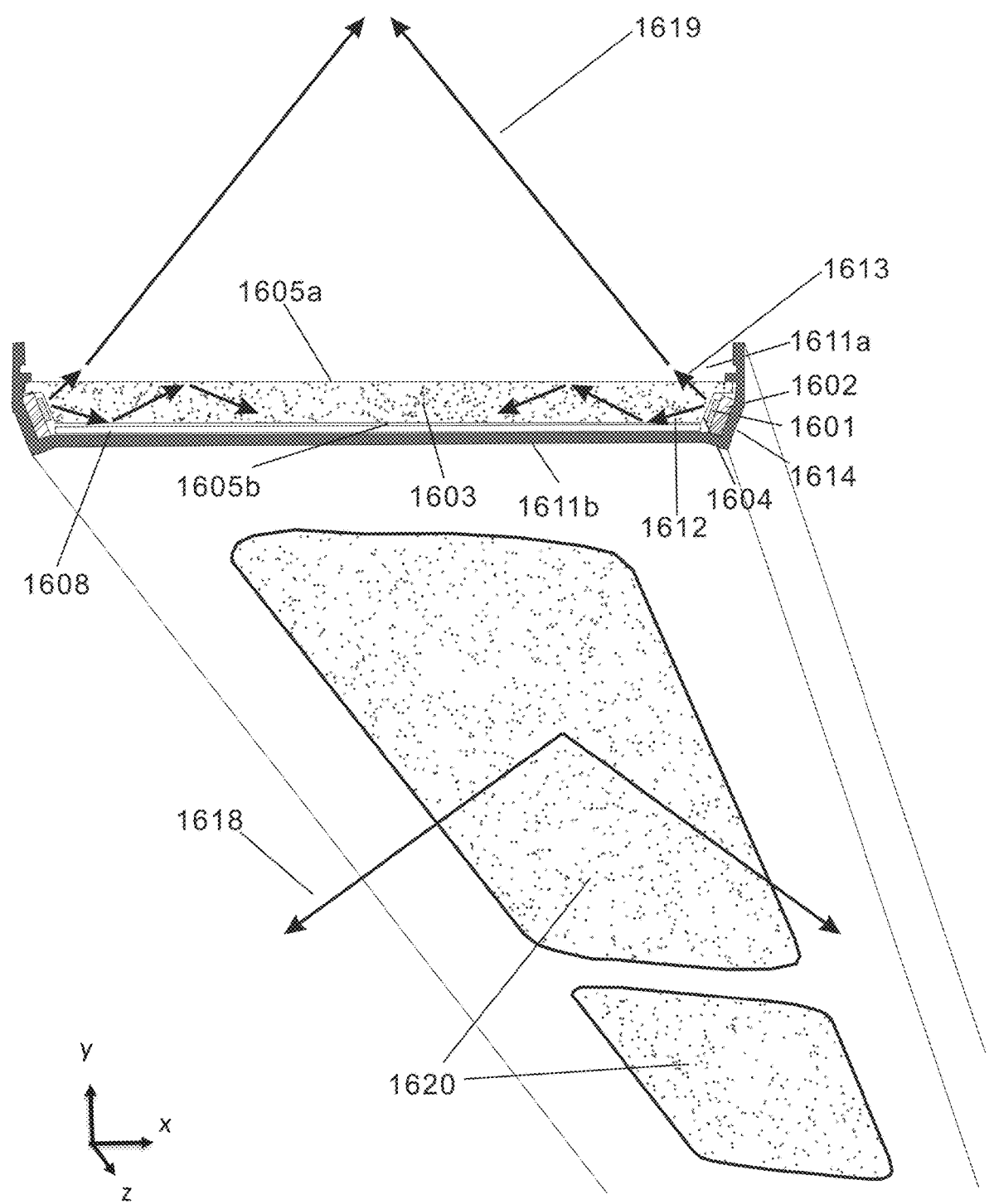
FIG. 16 is a view of a direct/indirect light fixture embodiment.

FIG. 16 is a cross-section perspective view of a direct/indirect light fixture embodiment with light input into two sides of the light fixture. The two sides are mirror images of each other so the following description applies to light input into the optical embodiment from both sides. Light from the LED 1601 on the LED board 1602 is received by the optical element input face 1604 of the optical element 1303 and propagates along a direct transmission path 1613, as illustrated by a single example light ray, and exits the optical element through optical element output face 1605a resulting in upward light distribution which becomes part of the indirect light output 1619 of the fixture. The optical element 1603 contains light scattering regions which cause some portion of light to scatter enough to exceed the critical total internal reflection angle to outcouple out one of the two optical element output faces 1605a and 1605b. The housing 1614 contains apertures 1620 on the bottom of the fixture which are openings in both the housing 1614 and reflector 1608 through which a portion of the total light output is transmitted. In this embodiment light propagating out the bottom of the fixture is considered direct light fixture output 1618 while light propagating upward is considered indirect light fixture output 1619. Alternative embodiments may contain a cover lens over the top or bottom of the fixture to enclose and/or further direct light to further adjust light distribution or visual appearance.

Figure 17:
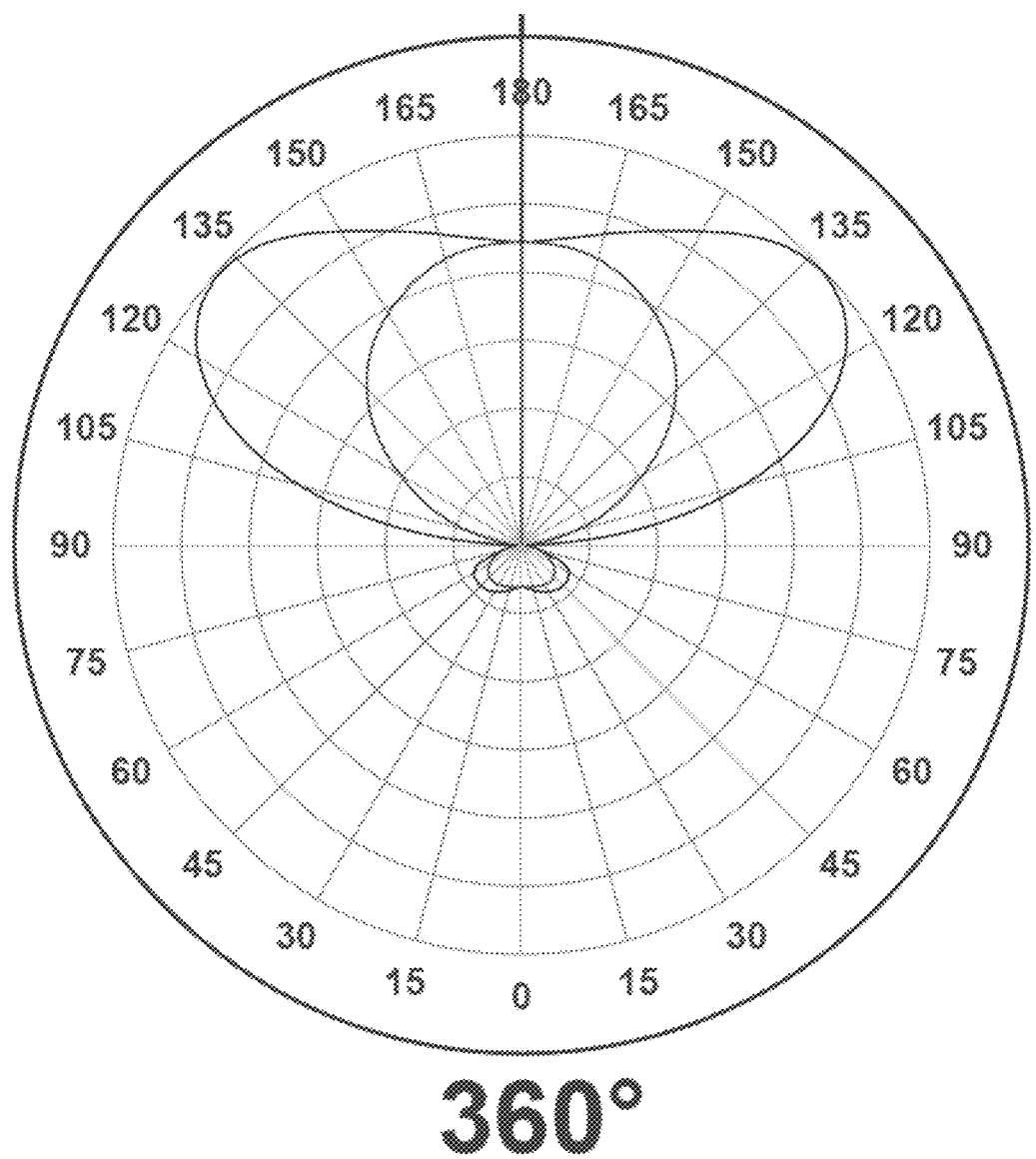
FIG. 17 is a polar plot illustrating the light distribution of the direct/indirect light fixture of FIG. 16.

FIG. 17 is a polar plot illustrating the measured light distribution of the direct/indirect light fixture embodiment of FIG. 16. Both indirect (upwards) and direct (downwards) light distributions are of a symmetrical batwing type useful for even illumination when projected onto flat target illumination surfaces such as ceiling, floors, and table tops. 14% of light is downward direct light fixture output and 86% is upward indirect light fixture output. Asymmetric embodiments are easily configured by adjusting to differ the amount of electrical power the power applied to the two using only a LED board on a single side of the optical element.

Figure 18:
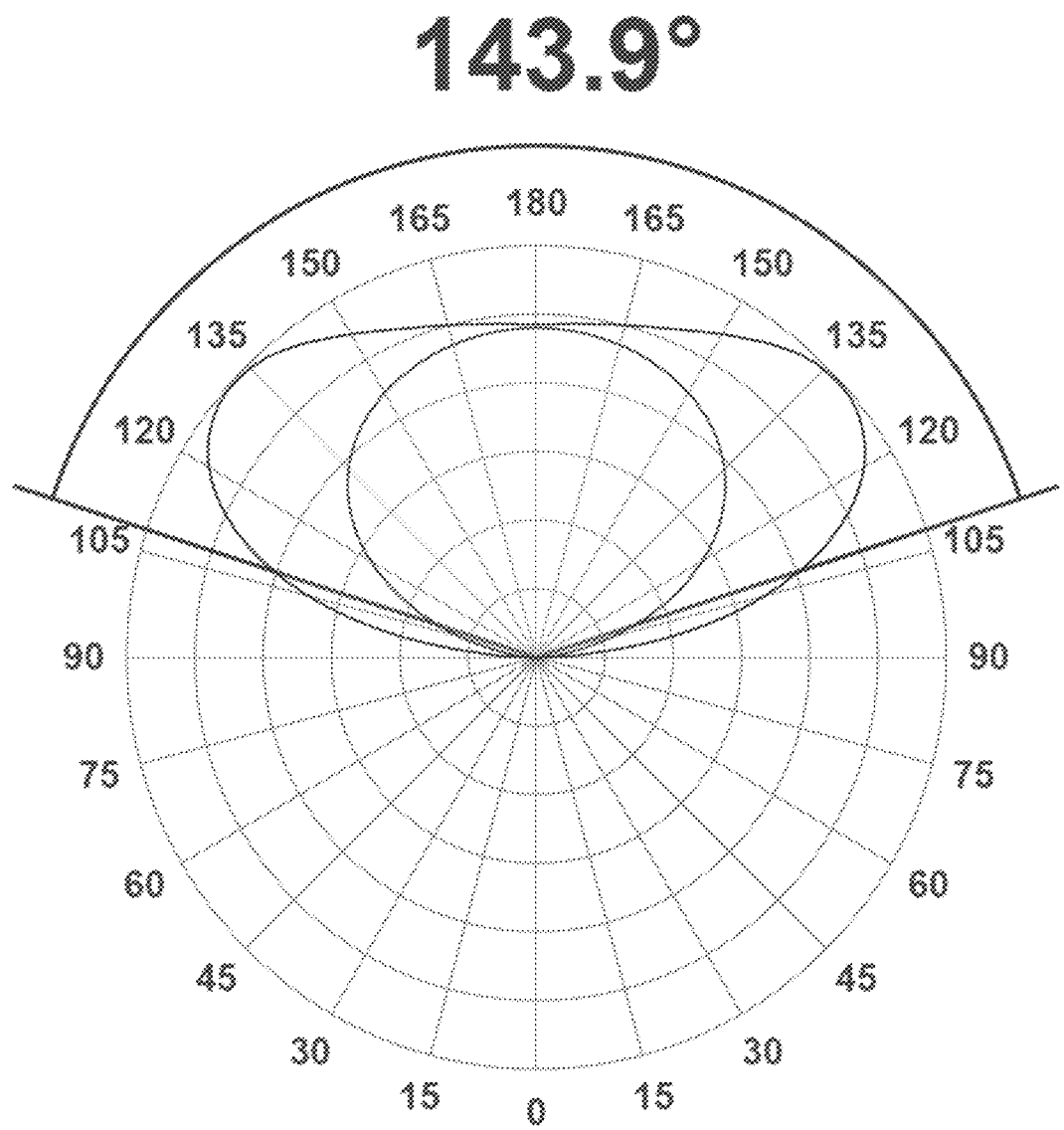
FIG. 18 is a polar plot of the light distribution of the light fixture embodiment of FIG. 16 reconfigured with to remove the apertures in the reflector and create an indirect only embodiment.

FIG. 18 is a polar plot of the measured light distribution of a light fixture embodiment of FIG. 16 reconfigured to remove the apertures in the reflector and create an indirect only embodiment. In this embodiment, the reflector 1608 does not have apertures but rather extends to cover the entire bottom side of the optical element.

Figures 19, 20A:
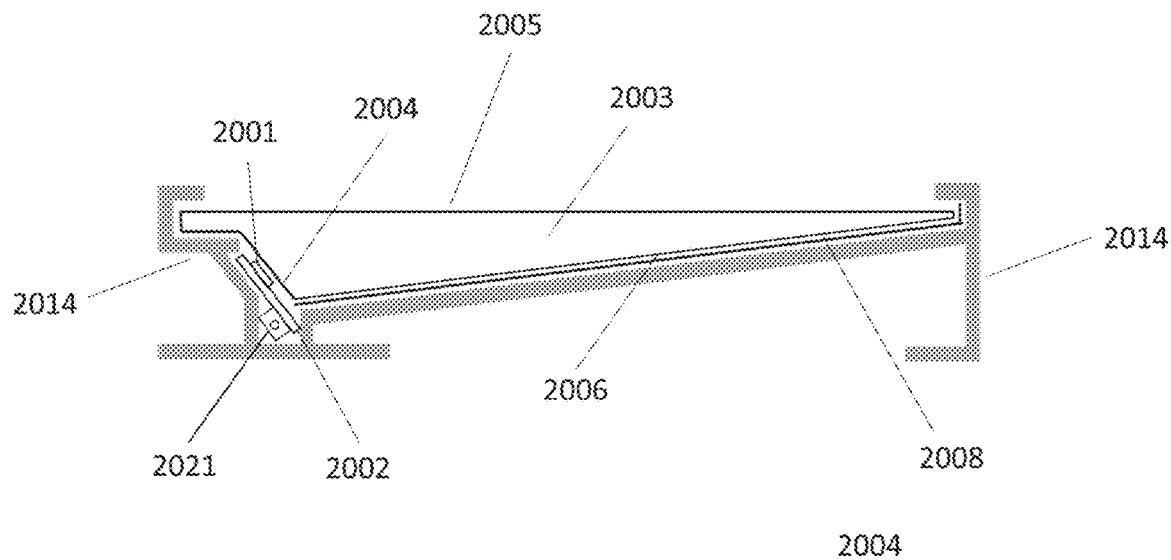
FIG. 19 is a table of data comparing the performance of differing configurations of the light fixture embodiment of FIG. 16.
FIG. 20A is a cross-section view of a cove light fixture embodiment.

FIG. 19 is a table of data comparing the performance of differing configurations of the light fixture embodiment of FIG. 16 and summarizes optical performance of high efficacy, light distribution, and a high ratio of indirect to direct light fixture output.

FIG. 20A is a cross-section view of a wall covefixture embodiment. An optical element 2003 receives light from an LED 2001 mounted on an LED board 2002 at an optical element input face 2004. The LED board 2002 is mounted within the housing 2014 and has on the opposite side from the LED an electrical connector 2021. The backside placement of the electrical connector allows the frontside with LED to maintain a flat plane for mounting flush to the housing. Light entering the optical element 2003 at the input face 2004 propagates through the optical element by a combination of direct transmission and TIR paths before outcoupling out the optical element output face 2005. Light that exits the light guide from the optical element opposing face 2006 reflects off the reflector 2008 and propagates back through optical element to exit out the output face 2005. The wedge shape of the optical element 2003 improves efficacy and uniformity by gradually decreasing the cross-sectional area available for TIR.

Figure 20B:
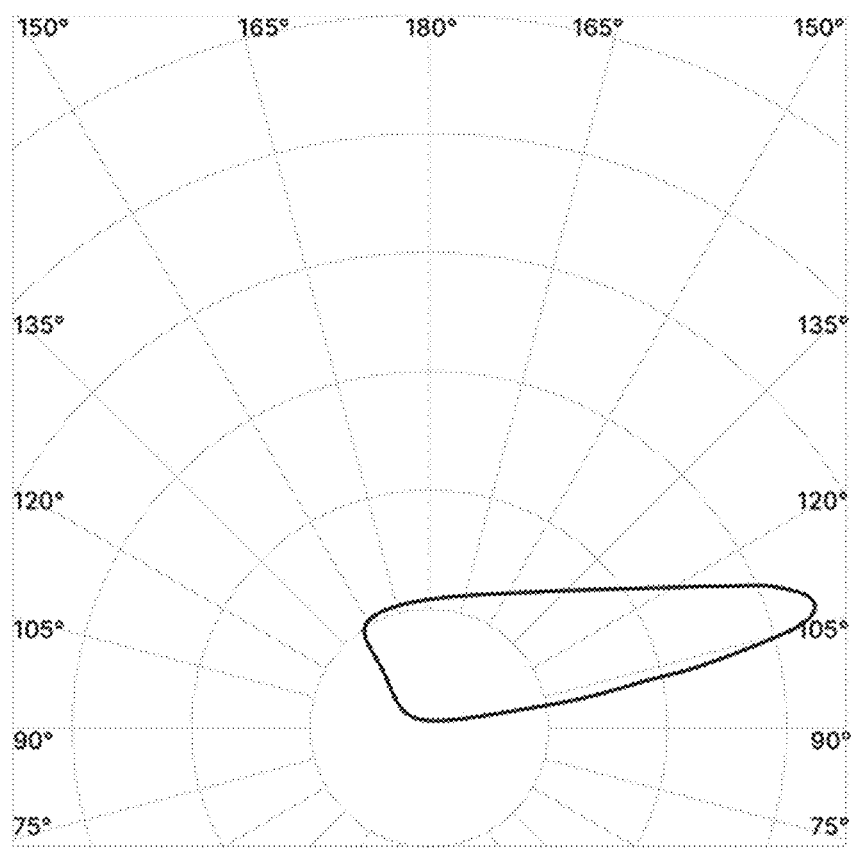
FIG. 20B is a sketch of a photometric plot representing the light distribution from the cove light fixture embodiment of FIG. 20A.

FIG. 20B is a sketch of a photometric plot representing the light distribution from the cove light fixture embodiment of FIG. 20A. The asymmetric light distribution is well suited for a cove lighting application wherein the light fixture is typically mounted horizontally near a wall/ceiling interface.

Figure 21A:
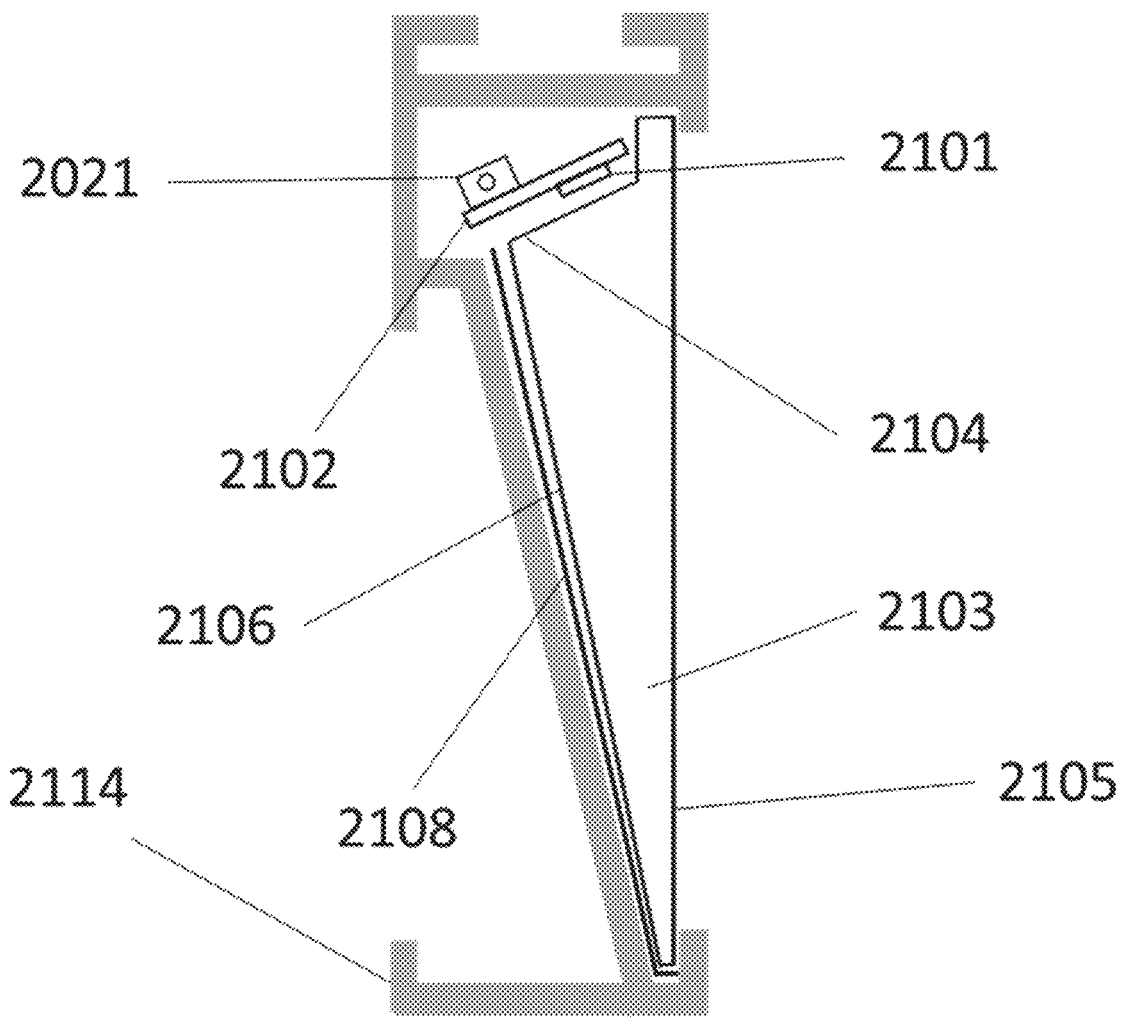
FIG. 21A is a cross-section view of a wall wash light fixture embodiment.

FIG. 21A is a cross-section view of a wall wash fixture embodiment. An optical element 2013 receives light from an LED 2101 mounted on an LED board 2102 at an optical element input face 2104. The LED board 2102 is mounted within the housing 2114 and has on the opposite side from the LED an electrical connector 2021. The backside placement of the electrical connector allows the frontside with LED to maintain a flat plane for mounting flush to the housing. Light entering the optical element 2103 at the input face 2104 propagates through the optical element by a combination of direct transmission and TIR paths before outcoupling out the optical element output face 2105. Light that exits the light guide from the optical element opposing face 2106 reflects off the reflector 2108 and propagates back through optical element to exit out the output face 2105. The wedge shape of the optical element 2103 improves efficacy and uniformity by gradually decreasing the cross-sectional area available for TIR.

Figure 21B:
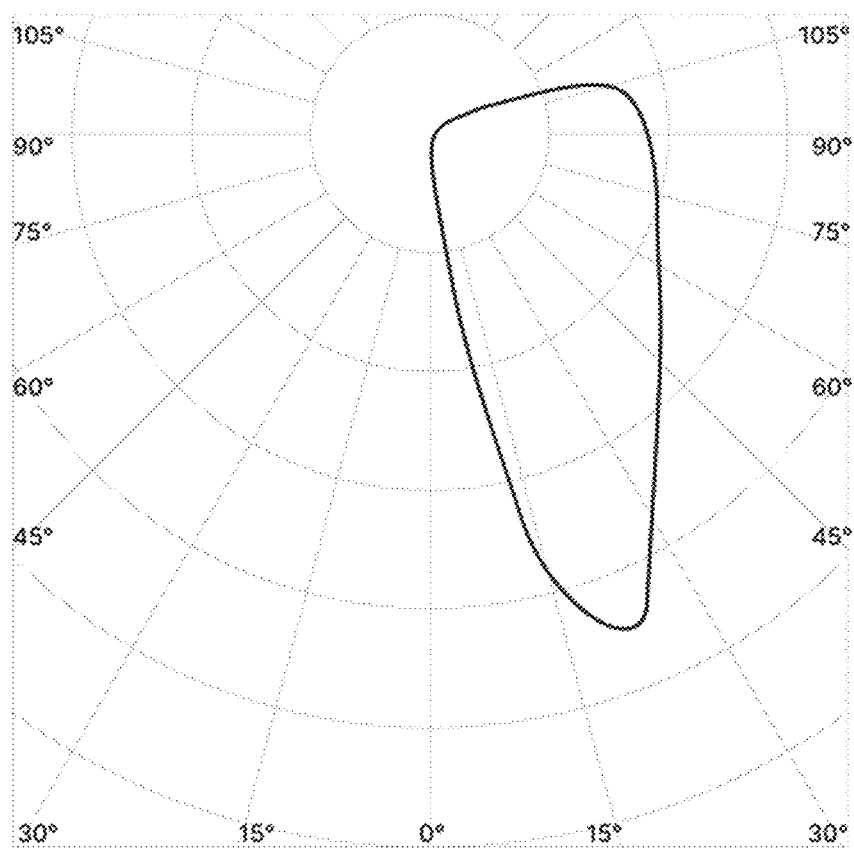
FIG. 21B is a sketch of a photometric plot representing the light distribution from the wall wash light fixture embodiment of FIG. 21A.

FIG. 21B is a sketch of a photometric plot representing the light distribution from the wall wash light fixture embodiment of FIG. 21A. The asymmetric light distribution is well suited for a wall wash application wherein the light fixture is typically mounted vertically with the optical element output face substantially parallel to a wall surface.

Figure 22:
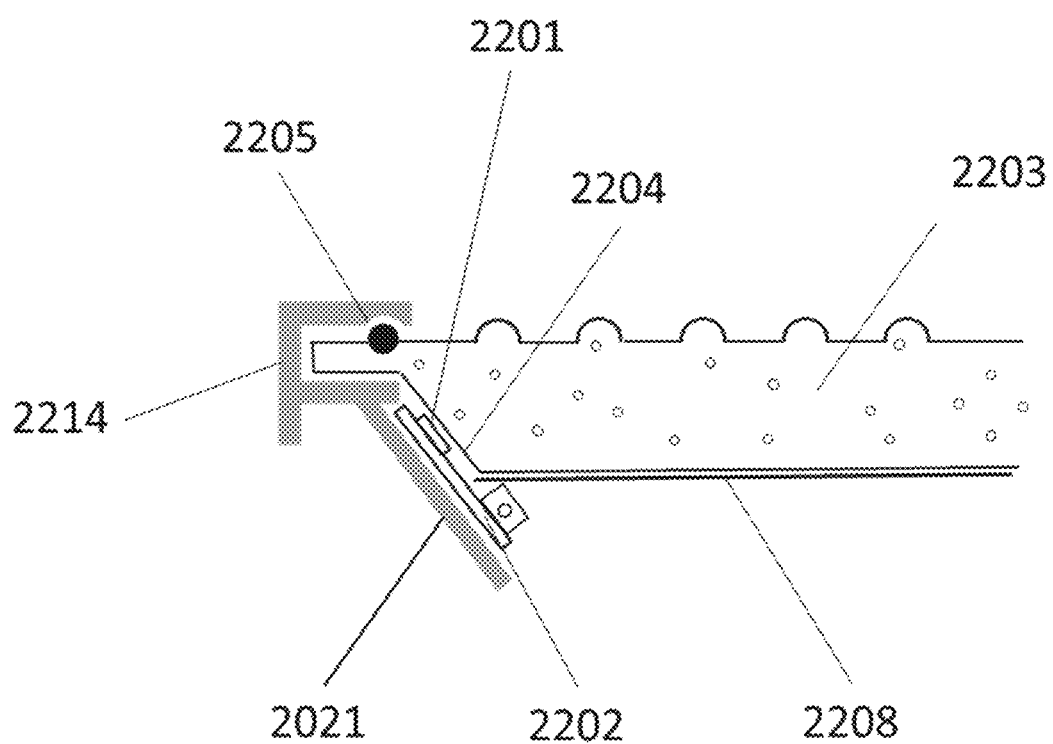
FIG. 22 is a cross-section view of a light fixture embodiment in which a gasket is fitted between the housing and optical element overhang to provide a seal with ingress protection.

FIG. 22 is a cross-section view of a light fixture embodiment with reflector 2208 in which a gasket 2205 is fitted between the housing 2214 and optical element 2203 overhang to provide a seal with ingress protection. The location of the gasket 2205 set back from the LED board 2202 with LED 2001 minimizes blockage of light output from the output face 2204 and can be an advantage in both efficacy and visual appearance.

What is claimed is:
1. a light fixture providing a direct downlighting light distribution comprising;
A) an optical assembly comprising;
1) an optical element comprising;
a) a bulk light transmissive material and further comprising light scattering features;
b) an extended profile shape comprising a cross sectional profile area of x-y axes extended in length orthogonally into a z-axis, further comprising;
(i) at least 3 specific faces, all extended in and substantially parallel with the z-axis, namely; an input face into which light is received, an inner opposing face adjacent to the input face, and an outer output face;
(ii) a cross-sectional height defined by the y-axis distance between the inner opposing face and the outer output face;
(iii) a cross-sectional width defined by the x-axis distance;
2) at least one LED board positioned proximate to the input face and comprising at least one LED light source mounted onto a printed circuit board (PCB);
3) at least one reflector mounted adjacent to the optical element inner opposing face such as to redirect light exiting from the optical element back into the optical element inner opposing face B) a housing having an extended profile shape with extended support feature with which the optical element is positioned and retained in optical alignment with the at least one LED board;

wherein a portion of light from the optical element input face is directly transmitted through the outer output face and a portion of light internally reflects from the outer output face and is propagated within the optical element such that a portion of said light is subsequently outer output from the inner opposing face whereupon it is reflected back into the optical element by the reflector such that the overall resultant light distribution from the optical element outer output face is substantially off axis with at least one peak intensity oriented at an oblique angle to the outer output face.

2. The light fixture of claim 1 wherein light scattering features comprise dispersed regions of refractive index differing from that of the bulk light transmissive material.

3. The light fixture of claim 2 wherein the dispersed regions are comprised of polymer beads.

4. The light fixture of claim 1 wherein the light scattering features are surface features upon an inner opposing face or outer output face.

5. The light fixture of claim 1 further comprising a reflector positioned adjacent to the opposing face to reflect light emitted from the opposing face back into the optical element.

6. The light fixture of claim 1 wherein the housing further comprises a portion that provides y-axis positioning support to the at least one reflector.

7. The light fixture of claim 1 wherein the housing and optical element are in parallel alignment.

8. The light fixture of claim 1 installed in a ceiling.

9. The light fixture of claim 1 mounted flush with ceiling tiles in a suspended grid ceiling system.

10. The light fixture of claim 1 mounted proximate to at least one T-bar in a suspended grid ceiling system.

11. The light fixture of claim 1 mounted within a rectangular arrangement of T-bars such that a T-bar is proximate on each of its sides and each of its longitudinal ends.

12. The light fixture of claim 1 wherein the optical element x-y axis profile cross-section is rectangular shaped.

13. The light fixture of claim 12 wherein at least one LED board is aligned vertically and perpendicular with the optical element outer output face.

14. The optical element of claim 1 wherein the cross-sectional height varies across the cross-sectional width.

15. The optical element of claim 14 wherein the optical element x-y axis profile cross-section is triangular shaped.

16. The light fixture of claim 1 wherein the optical element cross-sectional width varies with cross-sectional height.

17. The light fixture of claim 16 wherein the optical element x-y axis profile cross-section is trapezoidal shaped.

18. The light fixture of claim 1 having the input face and the outer output face arranged with the input face/output face obliquely angled within the x-y cross-sectional profile.

19. The light fixture of claim 18 wherein the input/output face alignment angle preferentially directs more light to the outer output face and less light to the inner opposing face.

20. The light fixture of claim 18 wherein the LED boards are aligned obliquely with the optical element outer output face.

21. The light fixture of claim 1 wherein the housing further comprises an extended support feature that is a bezel to hold the optical element in place and covers the outer perimeter of the optical element.

22. The light fixture of claim 21 wherein the bezel reduces hotspot and non-uniformities near the input face of the optical element.

23. The light fixture of claim 1 wherein the optical element further comprises an overhang which extends beyond the input face of the optical element and over an edge of the LED board.

24. The light fixture of claim 23 further comprising a bezel so as to retain the optical element overhang and therein retain the optical element.

25. The light fixture of claim 1 wherein the optical element is lit from one input face by at least one LED board and further comprises a reflector positioned adjacent to the opposing face.

26. The light fixture of claim 25 wherein the light output from the optical element outer output face is asymmetric with its peak intensity obliquely angled relative to the normal.

27. The light fixture of claim 26 wherein the peak intensity from the optical element outer output face is obliquely angled at between 40° and 60° from normal.

28. The light fixture of claim 1 wherein the optical element is comprised of two input faces, each adjacent to an receiving light from at least one LED board.

29. The light fixture of claim 28 wherein the light output from the optical element is a batwing type distribution with two peak intensities each obliquely angled relative to the normal.

30. The light fixture of claim 29 wherein the peak intensities are obliquely angled at between 40° and 60° from normal.

31. The light fixture of claim 1 wherein an input face of the optical element is positioned within a recessed cavity in the center of the optical element inner opposing face and the at least one LED boards is positioned within the cavity such as to input light from the at least one LED light sources into the optical element.

32. The light fixture of claim 1 further comprising an optically transmitting component which receives and transmits light from the outer output face of the optical element.

33. The light fixture of claim 32 wherein the housing further comprises an extended support feature that is a bezel to hold the optically transmitting component in place and cover the outer perimeter of the optically transmitting component.

34. The light fixture of claim 32 wherein the light distribution in the form of a polar plot from the optical element outer output face is different to the light distribution from the optically transmitting component output face.

35. The light fixture of claim 32 wherein the optically transmitting component is a diffusing lens and the light output from the optical element has at least one peak intensity obliquely angled relative to the normal and the light out from the outer output face of the optically transmitting component is less off axis.

36. The light fixture of claim 35 wherein the optically transmitting component comprises volumetric light redirecting properties.

37. The light fixture of claim 35 wherein the optically transmitting component comprises surface features.

38. The light fixture of claim 37 wherein the optically transmitting component surface further comprises light redirecting features.

39. The light fixture of claim 38 wherein the light redirecting features are linear lenticular features.

40. The light fixture of claim 32 wherein the housing additionally comprises a bezel or mounting feature to retain the optically transmitting component positioned over the outer output face of the optical element.

41. The light fixture of claim 1 wherein the LED board further comprises an electrical connector.

42. The light fixture of claim 41 wherein the electrical connector is offset and not in-line with the at least one LED light source.

43. The light fixture of claim 41 wherein the electrical connector is on a different side to the LED light source.

44. The light fixture of claim 41 wherein a portion of the reflector is positioned between the electrical connector and the inner opposing face of the optical element.

45. A ceiling grid assembly comprising at least one ceiling panel adjacent with the light fixture of claim 1 wherein the bottom surface of the ceiling panel and the output face of the optically transmitting component substantially aligned on the same horizontal plane.

\* \* \* \* \*